United States Patent [19]
Lantinberg

[11] Patent Number: 5,720,129
[45] Date of Patent: Feb. 24, 1998

[54] SEED CARRIER AND MARKER

[76] Inventor: Richard J. Lantinberg, 2810 Beauclerc Rd., Jacksonville, Fla. 32257

[21] Appl. No.: 511,312

[22] Filed: Aug. 4, 1995

[51] Int. Cl.$^6$ ..................................................... A01C 1/04
[52] U.S. Cl. ............................................ 47/56; 47/48.5
[58] Field of Search .......................... 47/56, 48.5, 48.5 R

[56] References Cited

U.S. PATENT DOCUMENTS

| | | | |
|---|---|---|---|
| 2,281,927 | 5/1942 | Fischer | 47/56 |
| 3,098,320 | 7/1963 | Estkowski | 47/56 |
| 3,098,321 | 7/1963 | Estkowski | 47/56 |
| 3,908,308 | 9/1975 | Meyers | 47/56 |
| 4,080,755 | 3/1978 | Crosby | 47/56 |
| 4,353,183 | 10/1982 | Estkowski | 47/56 |
| 4,442,627 | 4/1984 | Adams | 47/56 |

*Primary Examiner*—Henry E. Raduazo

[57] ABSTRACT

A seed carrier and marker includes an elongated peg having an upper end and a lower end, a soil level index between the ends of the peg for indicating a recommended depth to place the peg into soil, a seed, and placement structure for positioning the seed at about a predetermined position a selected distance below the soil level index, the placement structure including a water-degradable film for resisting movement of the seed away from the predetermined position. The water-degradable film is preferably fabricated of a water-soluble polymeric material with an adhesive on one side for adhering to the peg. The positioning structure can include a compartment defined by the lower end of the peg. The peg can be fabricated of a degradable material, such as a bio-degradable material or a photo-degradable polymeric material.

4 Claims, 2 Drawing Sheets

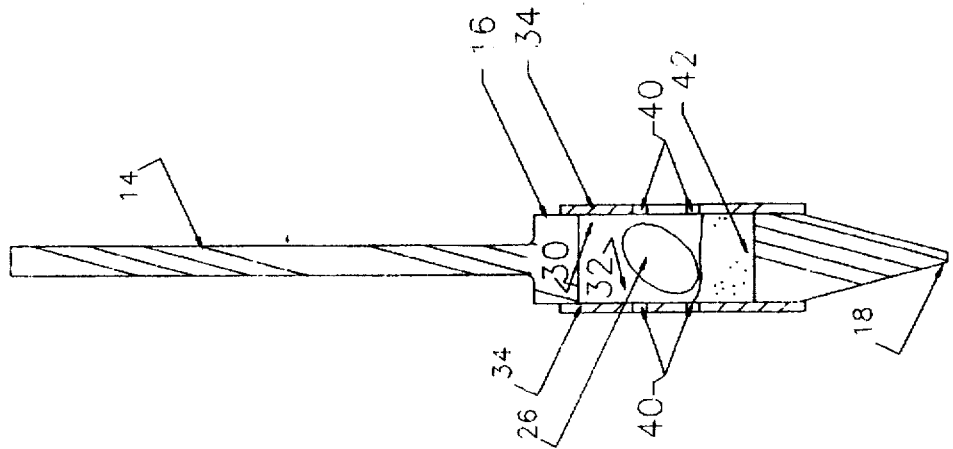
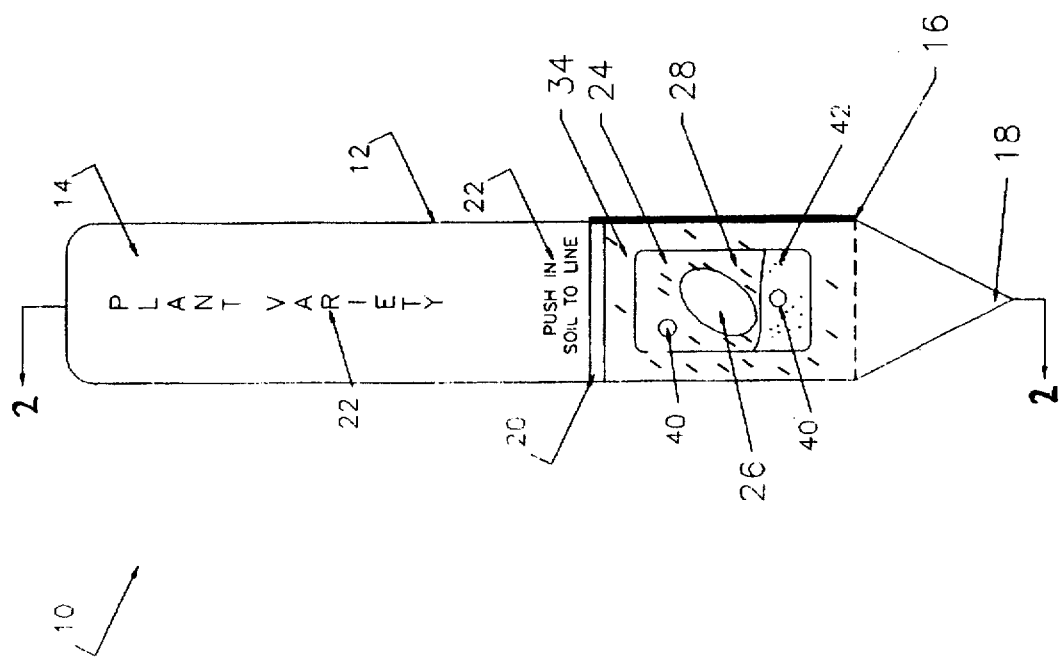

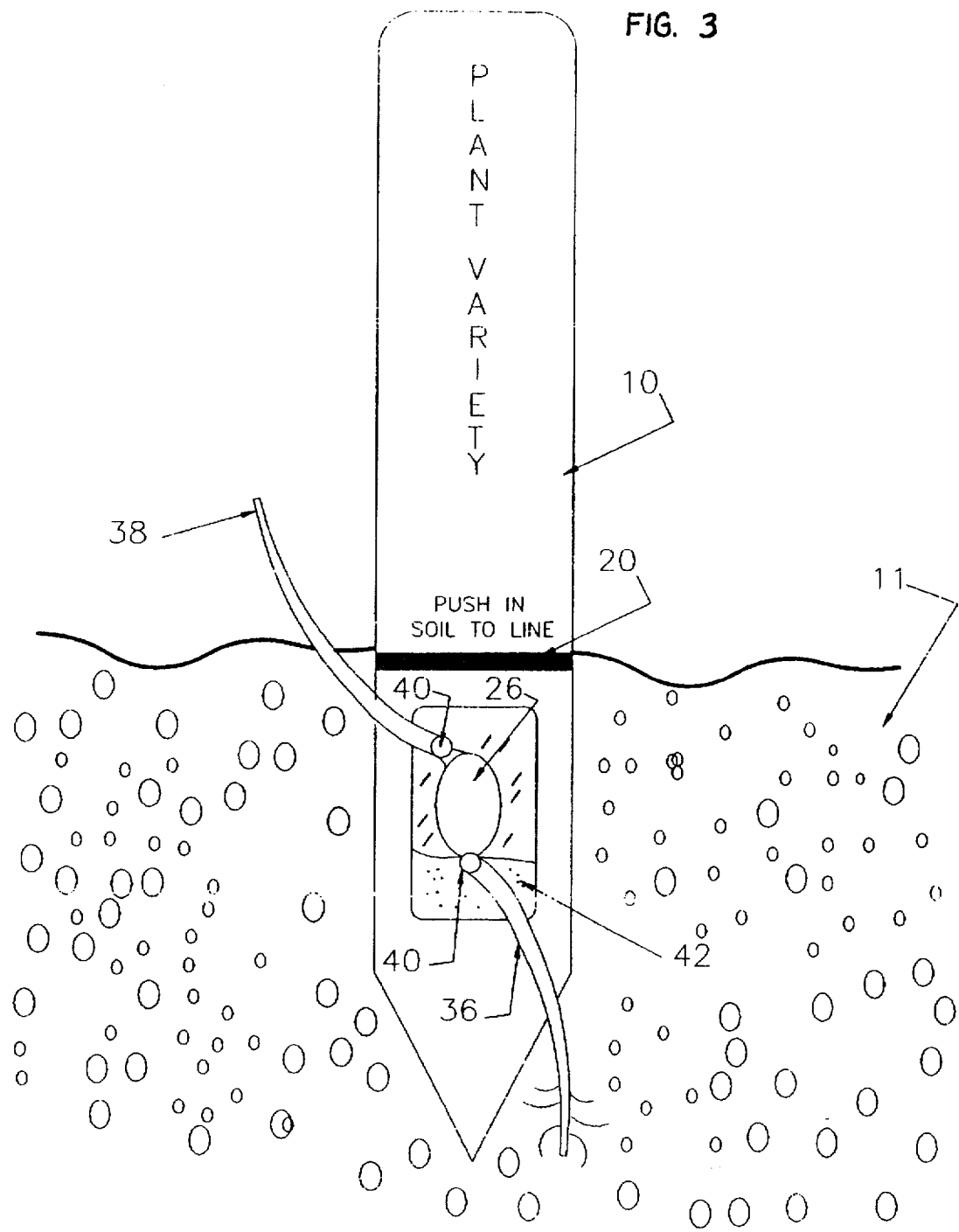

5,720,129

1

SEED CARRIER AND MARKER

BACKGROUND OF THE INVENTION

1. Field of the Invention

The invention relates to articles for planting and marking the placement of seeds, and, in particular, to a seed carrier and marker that includes a peg having a compartment defined by a lower end containing a seed, wherein the compartment is covered by a water soluble polymer film.

2. Description of the Prior Art

Home gardening is a popular pastime for many people. Planting a seed, seeing a plant sprouted from that seed rise from the ground and then caring for the plant is enjoyable and educational, too. It is important, however, that the placement of the seeds are marked so that the young shoots sprouting from the seeds do not accidentally get trampled upon. It is also important for germination and growth that the seeds are planted at a proper depth in the soil and that they are adequately spaced apart from one another.

One type of device that addresses these concerns is a unitary seed carrier and marker. A typical seed carrier and marker includes an elongated stick or peg that is tapered at a bottom end, a seed attached to a lower portion of the stick, and a line or other indicia on the stick a predetermined distance above the seed for indicating the depth of placement in the soil. A seed carrier and marker of this type is especially useful for growing a small number of plant specimens.

One method of attaching the seed to the stick is with a bead of glue. However, too much glue can encase the seed and thereby inhibit germination and growth of the seedling. Too little glue will not properly secure the seed to the stick during handling or planting in the soil. Large seed varieties, such as, for example, kidney or lima beans, require too much glue to be practicable. A different method of carrying the seed is disclosed in U.S. Pat. No. 3,909,308. The patent describes a wooden plant marker having an aperture in a lower end that contains a seed plug formed of at least one seed encased in a water-soluble, translucent, wax-like substance. Manufacture of this type of seed carrier and marker is difficult, requiring complicated machinery and careful temperature control of the wax-like substance. In addition, the seed plug typically cannot be large enough to hold large seed varieties.

There is therefore a need for an improved seed carrier and marker that does not suffer the disadvantages of the prior art devices.

SUMMARY OF THE INVENTION

It is an object of the invention to provide an improved seed carrier and marker that is easier to manufacture than prior art systems.

It is another object of the invention to provide a seed carrier and marker that securely holds a seed during handling and planting.

It is another object of the invention to provide a seed carrier and marker that can be used with large seed varieties.

These objects and others are obtained with a seed carrier and marker of the present invention that includes an elongated peg having an upper end and a lower end, soil level index means between the ends of the peg, a seed, and placement structure for positioning the seed at about a predetermined position a selected distance below the soil level index means. The placement structure includes a water-degradable film for resisting movement of the seed away from the predetermined position.

2

The placement structure can include a compartment defined by the lower end of the peg, the compartment having a first opening covered by the water-degradable film. The compartment preferably has second opening that is covered by the water-degradable film, and is structured such that the compartment forms an aperture.

The compartment can include growth structure for permitting roots and shoots growing from a germinated seed to emerge from the compartment without substantial obstruction.

The water-degradable film can be fabricated of a polymeric material that can be selected from the group consisting of polyvinylalcohol, polyethylene oxide and methyl cellulose. The water-degradable film can include an adhesive backing on a side facing the peg for adhering the film to the peg, and include film apertures for permitting growth of a root shoot and a stem shoot out of the aperture of the peg.

Structure for retaining moisture in contact with the seed, such as a porous material, can be placed within the peg compartment such that, after the seed carrier and marker is set in the ground and watered, the porous material will absorb and retain water and maintain a moist contact with the seed, thereby aiding in germinating the seed.

The peg can be fabricated of a degradable material, such as wood, cardboard, a bio-degradable material or a photo-degradable polymeric material.

The foregoing objects and aspects of the invention will be more fully understood from the following description of the invention with reference to exemplary embodiments as illustrated in the drawings appended hereto.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variations within the scope of the appended claims. In the drawings, FIG. 1 is an elevation view of a seed carrier and marker of the invention.

FIG. 2 is a sectional view through line 2—2 of FIG. 1.

FIG. 3 is an elevation view of a seed carrier and marker set in the ground and illustrating the growth of a germinated seed.

DETAILED DESCRIPTION OF THE INVENTION

Referring now to the drawings, FIGS. 1–3 illustrate an embodiment of a seed carrier and marker, or planter, 10 according to the invention. FIG. 1 shows the planter 10 in front elevation view and FIG. 2 shows a sectional view of the planter 10 illustrated in FIG. 1. FIG. 3 shows placement of the planter 10 in soil 11. For convenience of description, similar structures illustrated in different figures will be referred to by the same reference numbers in the following description.

The planter 10 includes an elongated peg 12 that is preferably fabricated of a degradable material, such as, for example, wood, cardboard, a bio-degradable material or a photo-degradable polymeric material. The peg 12 includes an upper end 14 and a lower end 16 that preferably includes a tapered point 18. A soil level index marker 20 indicates a preferred depth for placement of the peg 12 into soil 11. In this embodiment the index marker 20 is a horizontal line inscribed or etched into the peg 12, however, other types of structures can be used. Other indicia 22 can provide, for example, plant identification, planting instructions, and plant care instructions.

The lower end 14 of the peg 12 defines placement structure 24 for positioning a seed 26 at about a predetermined position a selected distance below the soil level index marker 20. In the embodiment illustrated in the figures, the placement structure 24 includes a compartment, preferably a peg aperture 28 that extends through the peg that is defined by the lower end 16 of the peg 12 and having spaced apart first and second openings 30, 32, respectively. The seed 26 is positioned in the aperture 28, and a water-degradable film 34 positioned over the first and second openings 30, 32 resists movement of the seed 26 away from the predetermined position. The water-degradable film 34 is preferably translucent such that the seed 26 is viewable from outside the compartment.

Water-degradable film 34 preferably includes an adhesive layer (not shown), as is well known to those of ordinary skill in the art, located on one side for adhering to the peg 12. Water-degradable film 34 can be fabricated of a polymeric material that is well known in the art of agrochemical packaging, such as, for example, a polymer selected from the group consisting of polyvinylalcohol, polyethylene oxide and methyl cellulose. One type of suitable water-degradable film can be Water Wash Away Tape, available from AD Tape & Label of Menomenee Falls, Wis., which film comes with an adhesive on each side covered by a peel-away paper backing. The use of water-degradable film 34 permits the use of larger seed varieties than was otherwise practical with prior art seed carriers and markers. The adhesive is preferably water-soluble so as to leave a minimal residue.

The placement structure 24 preferably includes growth structure for allowing roots 36 and shoots 38 growing from a germinated seed 26 to emerge from the compartment without substantial obstruction. The growth structure can, for example, be in the form of film apertures 40, perforations (not shown), flaps (not shown) or other types of "weak spots" in the water-degradable film 34.

It is also useful to include a wetting structure 42 in the compartment for providing moisture to the seed 26 after the planter 10 is set in the ground and watered. The wetting structure 42 can be a porous material, such as, for example, felt or blotter paper, that the seed 26 rests upon. The wetting structure 42 can be impregnated with one or more preferably water-soluble agrochemicals, such as a fertilizer, fungicide or pesticide, for enhancing the development of a plant growing from the seed 26. Alternatively, granular agrochemicals (not shown) can also be simply set alongside the seed 26, or the seed 26 can be coated with water-soluble agrochemicals.

The aperture 28 is sized to hold one or more seeds of a selected seed variety. The selected seed variety can be the seed of an ornamental flower, such as, for example, bachelor button, marigold, morning glory, sunflower, or any number of wild flower varieties. The selected seed variety can also be a seed of a vegetable or fruiting plant, such as, for example, bean, carrot, cucumber, eggplant, gourd, green bean, melon, pretty cabbage, pumpkin, radish, squash, watermelon, zucchini, or other vegetable. The selected seed variety can also be a seed of a deciduous or coniferous tree or shrub. Of course, the selected distance between the aperture 28 and the index marker 20 is determined by the ideal planting depth of the seed variety. The aperture 28 is preferably at least about 0.25 inches wide, at least about 0.25 inches high and at least about 0.25 inches deep. For large seed varieties, such as various beans, the aperture is preferably about 0.5 inches wide, about 0.75 inches high and about 0.375 inches deep.

The peg 12 illustrated in the figures is fabricated of a rigid photo-degradable polymeric material that can be formed into a selected shape. A polymer, such as a polyolefin or polyethylene, can be made photo-degradable by introducing impurity molecules containing oxygen and/or heavy metals. Under the action of ultraviolet light, in particular, the impurity molecules form free radicals that can rupture the bonds in the polymer to make it fragile. The degree of photo-degradability can be selected by adjusting the impurity level in the polymer such that upper end 14 of the peg 12 degrades after a predetermined exposure of the peg to sunlight after planting. Photo-degradable polymeric materials are well known for uses such as for mulch film, packing materials and trash bags. Suitable polymeric materials for use with the invention include a Scott-Gilead formula, available from Plastigone of Fort Myers, Fla., or Ecolyte film, available from Ecolyte of Toronto, Canada, or Polygrade film, available from Ampacet of White Plains, N.Y.

Alternatively, the peg 12 can be fabricated of a bio-degradable material, such as, for example, a bio-degradable plastic resin that may contain corn starch, or a potatostarch-based plastic.

To use the planter 10, the peg 12 is inserted in the soil 11 such that the lower end 16 is covered up to the index marker 20. Watering the soil degrades the film 34, allowing the wetting structure 42 and the seed 26 to be moistened. Moisture can also enter the compartment via film apertures 40. Wetting structure 42 retains water and, since the seed 26 is in contact with it, allows the seed to remain moistened by capillary action, thus enhancing the probability of germination. Fertilizers or other agrochemicals incorporated into the wetting structure 42 or otherwise included in the compartment help the seedling grow. The photo- or bio-degradability of the peg 12 can be selected such the upper end 14 will not degrade for a period of weeks and will serve as a marker for the seedling until it is mature enough to be recognizable.

Whereas particular embodiments of the invention have been described hereinabove for purposes of illustration, it will be appreciated by those skilled in the art that numerous variations of the details may be made without departing from the invention as described in the appended claims.

I claim:

1. A seed carrier including:
   an elongated peg having an upper end and a lower end;
   a soil level index means between the ends of the peg and
      a seed compartment provided below said index means;
   a seed; and
   a placement means for positioning the seed at or about a predetermined position below the soil level index means, the placement mean including a water degradable film covering said compartment and resisting movement of the seed away from the predetermined position and a layer of adhesive provided on one of the peg or the film for adhering the water degradable film on the peg.

2. The seed carrier of claim 1 wherein the placement means including a water degradable film covering said compartment and resisting movement of the seed away from the predetermined position is perforated for providing moisture to the seed.

3. The seed carrier of claim 1 wherein the placement means includes an opaque water degradable film covering said compartment and resisting movement of the seed away from the predetermined position.

4. A seed carrier including:

an elongated peg having an upper end and a lower end;

a soil level index means between the ends of the peg and a seed compartment provided below said index means;

a seed; and a placement means for positioning the seed at or about a predetermined position below the soil level index means, the placement means including a water degradable film covering said compartment and resisting movement of the seed away from the predetermined position and a porous capillary growth means provided in said compartment for providing moisture to the seed.

* * * * *